(No Model.)
C. C. MILLER.
SPLIT LOOSE PULLEY.
No. 423,068. Patented Mar. 11, 1890.
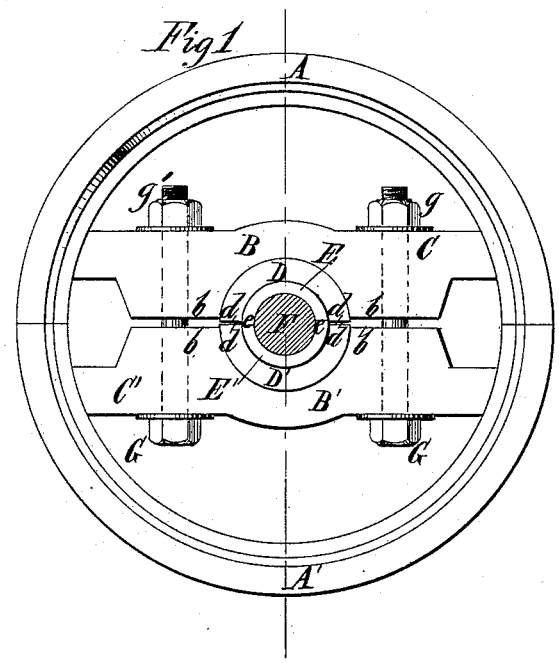
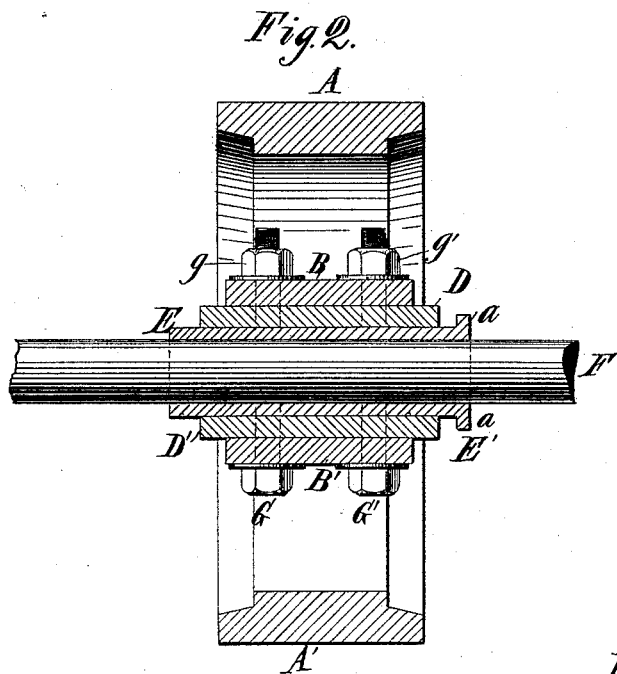
Witnesses:
John Bickch
Fred Haynes
Inventor:
Charles C. Miller
by attorneys
Brown & Griswold

UNITED STATES PATENT OFFICE.

CHARLES C. MILLER, OF NEW YORK, N. Y.

SPLIT LOOSE PULLEY.

SPECIFICATION forming part of Letters Patent No. 423,068, dated March 11, 1890.

Application filed June 12, 1889. Serial No. 313,959. (No model.)

*To all whom it may concern:*

Be it known that I, CHARLES C. MILLER, a citizen of the United States, residing in the city and county of New York, and State of New York, have invented a new and useful Improvement in Split Loose Pulleys, of which the following is a specification, reference being had to the accompanying drawings.

The object of this invention is to provide for the easy conversion of such split pulleys as are now commonly manufactured for tight pulleys into loose pulleys for shafting of various sizes.

I will now proceed to describe my invention with reference to the accompanying drawings, and afterward point out its novelty in a claim.

Figure 1 in the drawings is a side view of a loose pulley constructed according to my invention. Fig. 2 represents an axial section of said pulley and a longitudinal view of a piece of shafting on which it is applied.

Similar letters of reference designate corresponding parts in both the figures.

A B C designate one of the separable members of the split pulley, and A' B' C' designate the other of said members. Each of these members consists of a rim portion A or A', a hub portion B or B', and a connection C or C' between the hub portion and the rim. In the example represented the hub portion B or B' and its connections C or C' with the rim are comprised in a single bar which extends across the rim portion A or A'.

D D' designate two portions or halves of a longitudinally-divided sleeve, which is fitted to an opening suitably bored or formed in the hub portions B B'.

E E' designate two portions or halves of a longitudinally-divided bushing, the bore of which is such that it will fit loosely upon the shaft F, to which the loose pulley is to be applied, and the exterior of which is fitted to a bore in the sleeve D.

G G' are two clamping-bolts passing through spoke bars or connections between the hub portions and rims of the two separable members of the pulley and furnished with nuts $g$ $g'$, by which the said members may be screwed up together and made to clamp the sleeve D D', and thereby caused to make the latter clamp the bushing E E' and hold the two separable members close together at their meeting faces. The bushing is thus at the same time held firmly and securely in the pulley.

In order that the bushing may be so held firmly and securely the meeting faces $b$ of the hub portions B B' and the spoke-bars C C' or connections between the hub portions and rims and the bores of the hub portions are so constructed and the meeting faces $d$ of the two portions of the sleeve D D' are also so constructed, as clearly shown in Fig. 1, that all of the said meeting faces will be separated, while the meeting faces $e$ of the bushing are close together. The bushing E is represented as having a collar $a$ at one end to serve as a bearing-face to come against the fast pulley on the shaft. This collar, however, is not very material, as such a bearing will be formed by either end of the bushing, which is made to project beyond the pulley or its sleeve B.

In order to adjust the loose pulley at the proper distance from the fast pulley, it is only necessary to shift the bushing lengthwise in the sleeve. This may be done before the bolts and nuts are screwed up tightly after the loose pulley has been placed on the shaft, or it may be done after slackening the bolts if the pulley had been previously tightened up on the bushing.

This invention is applicable to split pulleys of all constructions, whether made of metal or of wood; but in any case I should make the bushing of some suitable metal, such as Babbitt metal.

By this invention the split pulleys of different make now commonly sold and to which separable clamping-sleeves of different sizes are provided to enable them to serve as fast pulleys for shafts of different sizes may be converted into loose pulleys by selecting a clamping-sleeve, as D D', of suitable bore and placing in it a proper one of a number of bushings—such as E E'—of various sizes, which may be kept on hand for the purpose.

What I claim as my invention, and desire to secure by Letters Patent, is—

The combination, in a split pulley, of two separable members, each consisting of a portion of a rim and a portion of a hub and a connection between said rim portion and said hub portion, a longitudinally-divided clamping-sleeve fitted between the said separable members, a longitudinally-divided bushing within the said sleeve, and clamping-bolts between the said separable sections, the meeting or opposed faces of the hub and those of the divided sleeve being slightly separated and the meeting faces of the bushing being in contact with each other, said hub portions being clamped upon the sleeve and the sleeve upon the bushing, substantially as herein set forth.

CHARLES C. MILLER.

Witnesses:
FREDK. HAYNES,
JOHN BICKET.